(12) United States Patent
Imagawa

(10) Patent No.: US 12,519,644 B2
(45) Date of Patent: Jan. 6, 2026

(54) EMBEDDED DEVICE AND DISPLAY SYSTEM

(71) Applicant: Mitsubishi Electric Corporation, Tokyo (JP)

(72) Inventor: Masanori Imagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 20 days.

(21) Appl. No.: 18/727,367

(22) PCT Filed: Apr. 11, 2022

(86) PCT No.: PCT/JP2022/017524
§ 371 (c)(1),
(2) Date: Jul. 9, 2024

(87) PCT Pub. No.: WO2023/199387
PCT Pub. Date: Oct. 19, 2023

(65) Prior Publication Data
US 2025/0097033 A1 Mar. 20, 2025

(51) Int. Cl.
*H04L 9/00* (2022.01)
*H04L 9/08* (2006.01)
*H04L 9/32* (2006.01)

(52) U.S. Cl.
CPC ..................... *H04L 9/32* (2013.01)

(58) Field of Classification Search
CPC ........................................................ H04L 9/32
USPC ........................................................ 713/168
See application file for complete search history.

(56) References Cited

U.S. PATENT DOCUMENTS

| | | | |
|---|---|---|---|
| 8,856,869 B1 * | 10/2014 | Brinskelle ........... | H04L 63/0823 726/2 |
| 9,264,905 B2 * | 2/2016 | Ferguson-Jarnes ... | H04W 12/06 |
| 10,728,044 B1 * | 7/2020 | Melo ..................... | H04L 9/0825 |
| 2011/0231774 A1 | 9/2011 | Kano | |
| 2014/0330821 A1 * | 11/2014 | Tullis .................... | G06F 16/248 707/728 |
| 2015/0261733 A1 * | 9/2015 | Mikutel .............. | G06F 3/04842 715/202 |

(Continued)

FOREIGN PATENT DOCUMENTS

| EP | 3287961 A1 * | 2/2018 | ......... G06F 16/9535 |
|---|---|---|---|
| JP | 2008-186160 A | 8/2008 | |

(Continued)

OTHER PUBLICATIONS

International Search Report of the International Searching Authority mailed Jul. 5, 2022 in International Patent Application No. PCT/JP2022/017524 (and English translation).

*Primary Examiner* — Haresh N Patel
(74) *Attorney, Agent, or Firm* — Posz Law Group, PLC

(57) ABSTRACT

An embedded device is connectable to an external terminal including an external browser to communicate with the external terminal. A storage stores a web document. A web server transmits the web document stored in the storage to a built-in browser through unencrypted communication and causes the built-in browser to display a first screen that is based on the web document. The web server transmits the web document stored in the storage to the external browser through encrypted communication and causes the external browser to display a second screen that is based on the web document.

13 Claims, 10 Drawing Sheets

(56) References Cited

U.S. PATENT DOCUMENTS

| | | | |
|---|---|---|---|
| 2015/0271292 A1 | 9/2015 | Tachi et al. | |
| 2018/0309847 A1* | 10/2018 | Gopal | H04L 67/60 |
| 2020/0151797 A1* | 5/2020 | Parhar | H04L 67/306 |
| 2020/0213211 A1* | 7/2020 | Jain | H04L 67/02 |
| 2020/0249965 A1* | 8/2020 | Shturma | G06F 9/451 |

FOREIGN PATENT DOCUMENTS

| | | | |
|---|---|---|---|
| JP | 2011-197968 A | | 10/2011 |
| JP | 2015-179894 A | | 10/2015 |
| JP | 2021-002178 A | | 1/2021 |
| JP | 2022027129 A | * | 2/2022 |

* cited by examiner

EMBEDDED DEVICE AND DISPLAY SYSTEM

CROSS REFERENCE TO RELATED APPLICATION

This application is a U.S. national stage application of PCT/JP2022/017524 filed on Apr. 11, 2022, the contents of which are incorporated herein by reference.

TECHNICAL FIELD

The present disclosure relates to an embedded device and a display system.

BACKGROUND

A known embedded device incorporates a display to display a screen. Recent embedded devices are connectable to networks to allow control with external terminals. For example, Patent Literature 1 describes an image processor that causes different operation screens to be displayed for access through a built-in web browser and for access through a web browser on an external device.

PATENT LITERATURE

Patent Literature 1: Unexamined Japanese Patent Application Publication No. 2011-197968

In such a system that causes a screen to be displayed on each of the built-in browser in the embedded device and the external browser incorporated in the external terminal, the screens to be displayed on the built-in browser and the external browser are to be generated based on the same web document to reduce effort to develop screens.

The built-in browser and the external browser use different security measures. More specifically, to cause the external browser to display a screen, communication through an external network is performed with enhanced security measures. To cause the built-in browser in the embedded device to display a screen, communication is performed internally in the embedded device with less security measures than communication with the external browser. The processing load in communicating with the built-in browser is to be reduced based on the difference in security measures.

SUMMARY

In response to the above issue, an objective of the present disclosure is to provide an embedded device and other techniques that cause a built-in browser and an external browser to display screens that are based on the same web document, with a reduced processing load in communicating with the built-in browser.

To achieve the above objective, an embedded device according to the present disclosure is connectable to an external terminal including an external browser to communicate with the external terminal. The embedded device includes a storage to store a web document, a built-in browser, and a web server to transmit the web document stored in the storage to the built-in browser through unencrypted communication and cause the built-in browser to display a first screen that is based on the web document, and to transmit the web document stored in the storage to the external browser through encrypted communication and cause the external browser to display a second screen that is based on the web document.

In the aspect of the present disclosure, the web server transmits the web document stored in the storage to the built-in browser through unencrypted communication, causes the built-in browser to display the first screen that is based on the web document, transmits the web document stored in the storage to the external browser through encrypted communication, and causes the external browser to display the second screen that is based on the web document. The embedded device according to the above aspect of the present disclosure thus causes the built-in browser and the external browser to display screens that are based on the same web document, with a reduced processing load in communicating with the built-in browser.

DETAILED DESCRIPTION

Figure 1:
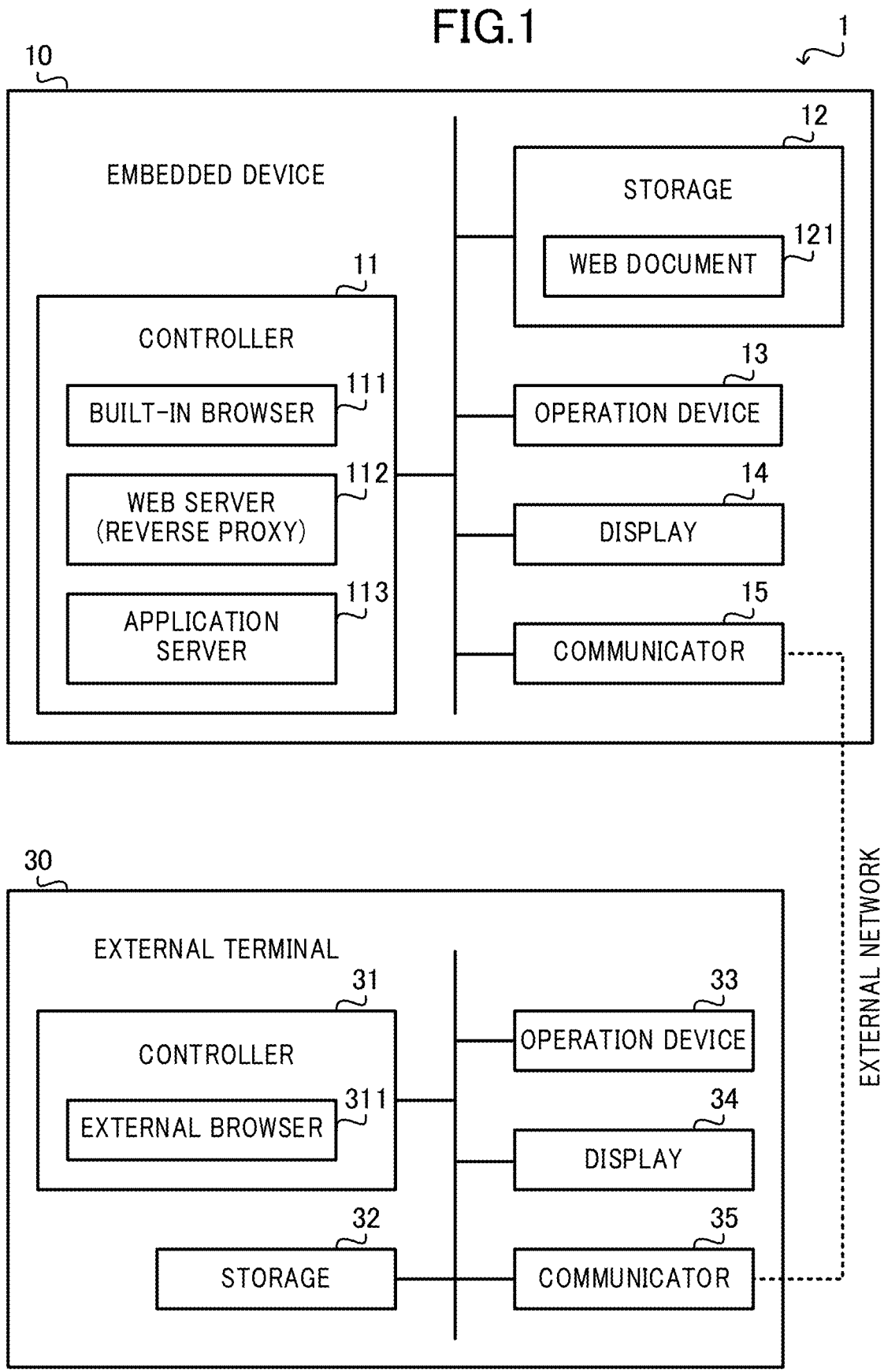
FIG. 1 is a block diagram of a display system according to Embodiment 1 with a first structure.

Embodiments are described below in detail with reference to the drawings. In the drawings, like reference signs denote like or corresponding components.

Embodiment 1

FIG. 1 is a block diagram of a display system 1 according to Embodiment 1. The display system 1 includes an embedded device 10 and an external terminal 30. The embedded device 10 has a screen display capability that allows the user to operate the embedded device 10 through direct touching while viewing the screen.

The embedded device 10 and the external terminal 30 are connected to communicate with each other through an external network indicated by the dashed line. The external network is a communication network, or more specifically, an information network such as a local area network (LAN) or the Internet. The user can operate the embedded device 10 with a browser of the external terminal 30 through the external network, without directly touching the embedded device 10.

The embedded device 10 is an electronic device controlled by embedded software and is an electronic device for a specific application, such as an air conditioner, a water heater, a rice cooker, a washing machine, a refrigerator, or a television. In the example described below, the embedded device 10 is an air conditioner controller for controlling an air conditioner.

The embedded device 10 includes a controller 11, a storage 12, an operation device 13, a display 14, and a communicator 15 that can be respectively referred to as a device controller, a device storage, a device operation device, a device display, and a device communicator.

The controller 11 includes a central processing unit (CPU). The CPU may also be referred to as, for example, the central processing device, the central arithmetic device, the processor, the microprocessor, or the microcomputer, and functions as a processor for performing processes and arithmetic operations for controlling the embedded device 10. In the controller 11, the CPU reads programs and data stored in the storage 12 and operates to centrally control the embedded device 10.

The storage 12 includes, for example, a read-only memory (ROM), a random-access memory (RAM), or a flash memory. The storage 12 stores programs and data used by the controller 11 to perform various processes. The storage 12 also stores data generated or acquired by the controller 11 through various processes.

More specifically, the storage 12 stores web documents 121. Each web document 121 is a data file that specifies an image to be displayed on the display 14. The web document 121 specifies data for a screen, such as a user authentication screen or an operation screen for the embedded device 10, to be displayed on the display 14 in accordance with predetermined rules. For example, a web document 121 includes HyperText Markup Language (HTML) or Cascading Style Sheets (CSS) for specifying the screen layout and JavaScript for describing the information on the screen.

The operation device 13 includes an input device such as a touchscreen, a touch pad, a keyboard, a mouse, or a physical button to receive an operational input from the user. The user can operate the operation device 13 to input various commands into the embedded device 10. The operation device 13 receiving a command input by the user outputs the received command to a built-in browser 111.

The display 14 includes a display device such as a liquid crystal display (LCD) panel or an organic electroluminescent (EL) panel. The display 14 is driven by a display driving circuit and displays various images output by the built-in browser 111.

The communicator 15 includes a communication interface to communicate with devices external to the embedded device 10. For example, the communicator 15 communicates with external devices including the external terminal 30 under a known communication protocol such as a local area network (LAN) or a universal serial bus (USB).

More specifically, the communicator 15 performs encrypted communication with the external terminal 30 through an external network. In response to a request from the external terminal 30, the communicator 15 transmits a web document 121 stored in the storage 12 to the external terminal 30.

The external terminal 30 external to the embedded device 10 functions as a web client. More specifically, the external terminal 30 is an operation terminal operable by the user, such as a personal computer, a smartphone, or a tablet computer. The external terminal 30 is connected to the embedded device 10 with an external network and is used to operate and monitor the status of the embedded device 10.

The external terminal 30 includes a controller 31, a storage 32, an operation device 33, a display 34, and a communicator 35 that can be respectively referred to as a terminal controller, a terminal storage, a terminal operation device, a terminal display, and a terminal communicator.

The controller 31 includes a CPU. The CPU may also be referred to as, for example, the central processing device, the central arithmetic device, the processor, the microprocessor, or the microcomputer, and functions as a processor for performing processes and arithmetic operations for controlling the external terminal 30. In the controller 31, the CPU reads programs and data stored in the storage 32 and operates to centrally control the external terminal 30.

The storage 32 includes a ROM, a RAM, or a flash memory. The storage 32 stores programs and data used by the controller 31 to perform various processes. The storage 32 also stores data generated or acquired by the controller 31 through various processes.

The operation device 33 includes an input device such as a button, a touch pad, or a touchscreen to receive an operational input from the user. The user can operate the operation device 33 to input various commands into the external terminal 30. The operation device 33 receiving a command input by the user outputs the received command to an external browser 311.

The display 34 includes a display device such as an LCD panel or an organic EL panel. The display 34 is driven by a display driving circuit and displays various images output by the external browser 311.

The communicator 35 includes a communication interface to communicate with devices external to the external terminal 30. For example, the communicator 35 communicates with external devices including the embedded device 10 under a known communication protocol such as a LAN or a USB.

More specifically, the communicator 35 performs encrypted communication with the embedded device 10 through an external network. The communicator 35 thus acquires the web document 121 transmitted by the embedded device 10.

In the embedded device 10, the controller 11 includes, as functional components, the built-in browser 111, a web server 112, and an application server 113. In the external terminal 30, the controller 31 includes, as a functional component, the external browser 311.

The functions of these components are implemented by software, firmware, or a combination of software and firmware. The software and the firmware are described as programs, and the programs are stored in the ROM or the storages 12 and 32. When the CPU executes the programs stored in the ROM or the storages 12 and 32, the functions of the components are implemented.

Figure 2:
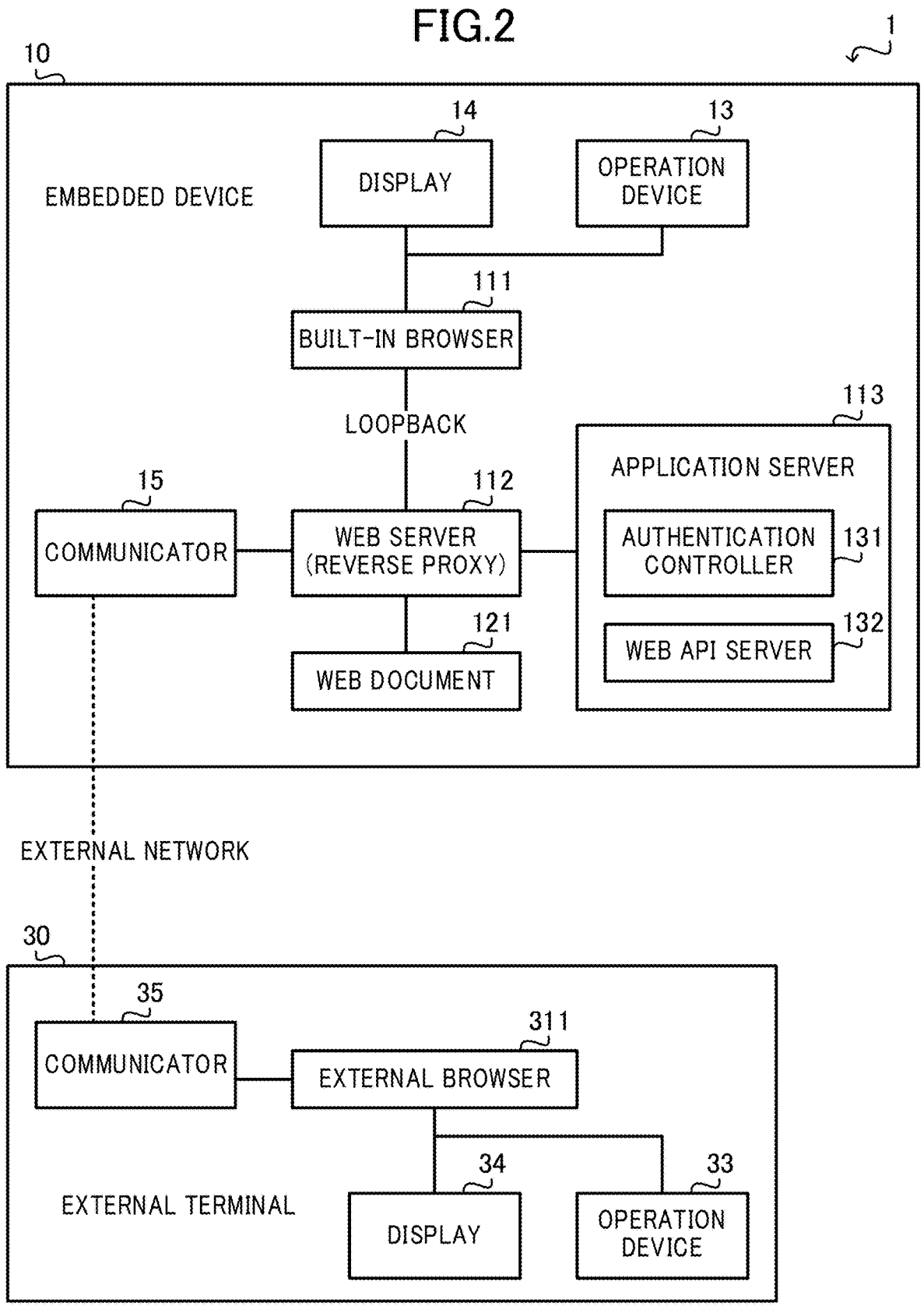
FIG. 2 is a block diagram of the display system according to Embodiment 1 with a second structure.

With reference to FIG. 2, the functions of each component included in the controllers 11 and 31 are described.

In the embedded device 10, the built-in browser 111 is a web browser built in the embedded device 10 and displays a display screen on the display 14. The built-in browser 111 acquires, from the operation device 13, an operation command that is input into the operation device 13 by the user of the embedded device 10.

The built-in browser 111 can connect to the web server 112 through internal communication in the embedded device 10. The built-in browser 111 acquires, through internal communication, the web document 121 stored in the storage 12 from the web server 112 and outputs a display screen that is based on the web document 121 to the display 14. The built-in browser 111 transmits, through internal communication, the operation command that is input by the user and acquired from the operation device 13 to the web server 112.

More specifically, the built-in browser 111 connects to the web server 112 through internal communication being loopback communication. Loopback communication uses 127.0.0.1 as the address of both the source browser and the destination server in Internet Protocol version 4 (IPv4) and uses ::1 for the address in Internet Protocol version 6 (IPv6). With such addresses assigned, the loopback communication can be distinguished from communication through an external network.

In the external terminal 30, the external browser 311 is a web browser installed in the external terminal 30 and displays a display screen on the display 34. The external browser 311 acquires, from the operation device 33, an operation command that is input into the operation device 33 by the user of the external terminal 30.

The external browser 311 can connect to the web server 112 in the embedded device 10 through an external network. The external browser 311 acquires, through the external network, the web document 121 stored in the storage 12 from the web server 112 and outputs a display screen that is based on the web document 121 to the display 34. The external browser 311 transmits, through the external network, the operation command that is input by the user and acquired from the operation device 33 to the web server 112.

In the embedded device 10, the web server 112 causes the web browsers being the built-in browser 111 and the external browser 311 to display screens. The web server 112 also functions as a reverse proxy that relays communication from the built-in browser 111 and the external browser 311. The web server 112 is built with, for example, Nginx (registered trademark).

The web server 112 distributes a web document 121 to the built-in browser 111 and the external browser 311, and causes the displays 14 and 34 to display screens that are based on the web document 121. More specifically, the web server 112 distributes the web document 121 stored in the storage 12 to both the built-in browser 111 and the external browser 311. With the same web document 121 distributed to both the built-in browser 111 and the external browser 311 to cause display screens to be displayed based on the distributed web document 121, the web documents 121 can be developed at lower costs.

When the same web screen is used by the built-in browser 111 and the external browser 311, the built-in browser 111 and the external browser 311 may not involve the same level of security measures for the display process. More specifically, for the external terminal 30 to connect to the embedded device 10 through the external network, security measures are taken to prevent unauthorized access to the embedded device 10.

More specifically, the security measures may include (1) encryption of communication between the external terminal 30 and the embedded device 10, (2) user authentication, or (3) authentication of a web application programming interface (API) for operating the embedded device 10 through the external network. In Embodiment 1, for each of (1) to (3), different security measures are taken for the display process in the built-in browser 111 and for the display process in the external browser 311.

(1) Encryption of Communication

Encryption of communication is described first. The loopback communication between the built-in browser 111 and the web server 112 does not leak the communicated information externally, allowing communication to be performed without encryption. The CPU incorporated in the embedded device 10 has lower performance than a CPU in a typical personal computer, and thus can suffer from a load resulting from unintended encrypted communication.

The web server 112 thus performs unencrypted communication with the built-in browser 111 and encrypted communication with the external browser 311. An example unencrypted communication is Hypertext Transfer Protocol (HTTP) communication, and an example encrypted communication is Hypertext Transfer Protocol Secure (HTTPS) communication.

To achieve a change between communication with and without encryption based on the connection destination, the web server 112 functions as virtual servers. A virtual server allows a single piece of software to produce the same effect as when multiple servers are in operation.

Figure 3:
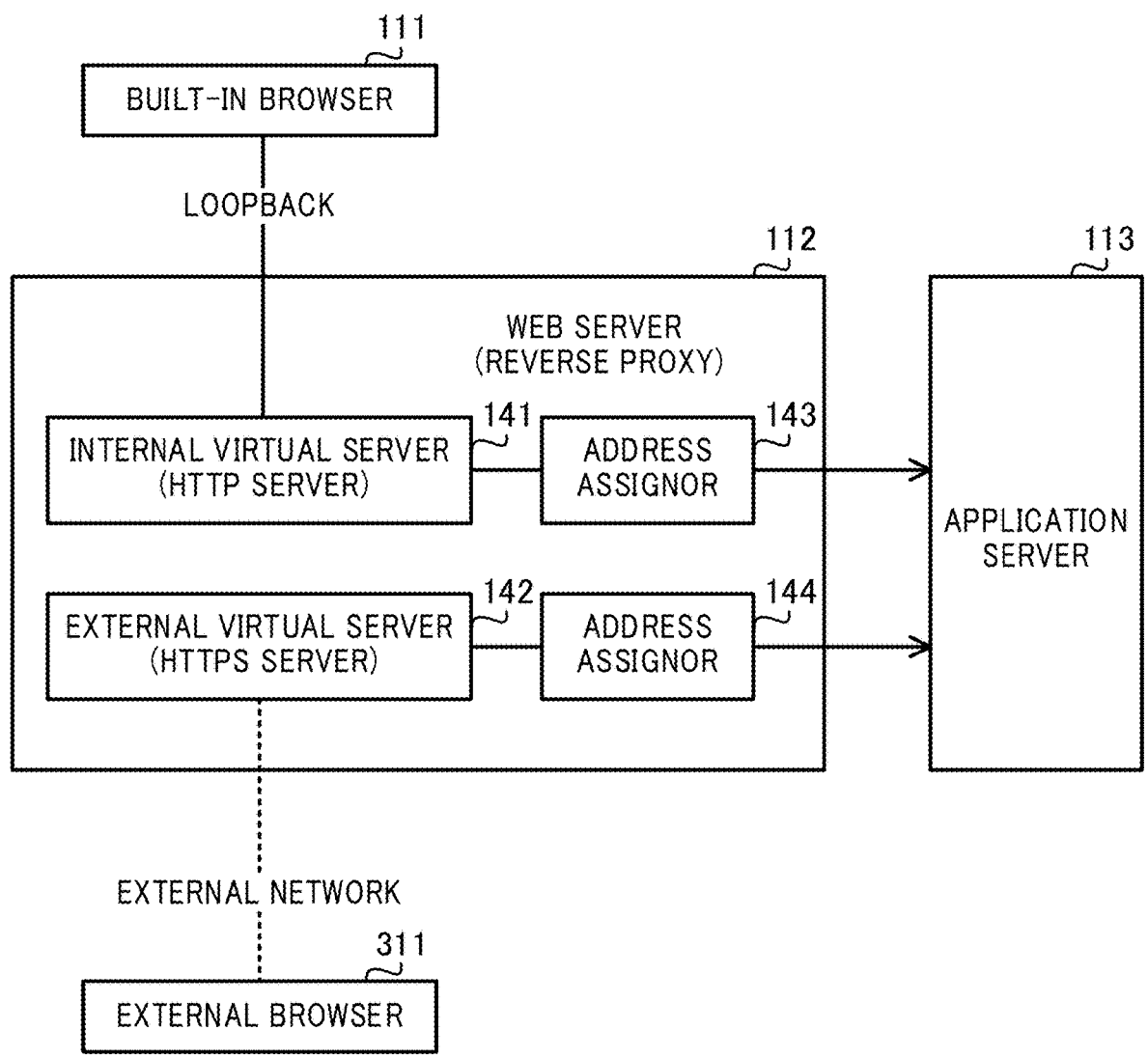
FIG. 3 is a block diagram of a web server in Embodiment 1.

More specifically, as illustrated in FIG. 3, the web server 112 includes an internal virtual server 141 and an external virtual server 142 as functional components. The web server 112 includes the internal virtual server 141 to perform unencrypted communication with the built-in browser 111 and includes the external virtual server 142 to perform encrypted communication with the external browser 311.

When receiving communication from the built-in browser 111 or the external browser 311, the web server 112 determines whether the connection destination of the communication is the built-in browser 111 or the external browser 311. As described above, the built-in browser 111 communicates with the web server 112 through loopback communication, whereas the external browser 311 communicates with the web server 112 through the external network.

When the address of the connection destination corresponds to a loopback address, the web server 112 determines that the connection is from the built-in browser 111. When the address of the connection destination corresponds to an address other than a loopback address, the web server 112 determines that the connection is from the external browser 311. The loopback address is 127.0.0.1 in IPv4 and ::1 in IPv6.

A connection determined to be from the built-in browser 111 is received by the internal virtual server 141. A connection determined to be from the external browser 311 is received by the external virtual server 142. In the internal virtual server 141, unencrypted communication, or HTTP communication, is enabled. In the external virtual server 142, encrypted communication, or HTTPS communication, is enabled.

When the screen is operated through the built-in browser 111, unencrypted communication is performed, thus reducing the load on the CPU in the embedded device 10. When a connection is transmitted from the external network through HTTP communication, the address of the connection destination is not the loopback address. The internal virtual server 141 thus does not receive the connection. The external virtual server 142 being not compatible with HTTP communication does not receive the connection either.

Unencrypted communication through the external network is rejected, with the security of the device being maintained.

The web server 112 transmits the web document 121 stored in the storage 12 to the built-in browser 111 through unencrypted HTTP communication and causes the built-in browser 111 to display a first screen that is based on the web document 121. The web server 112 transmits the web document 121 stored in the storage 12 to the external browser 311 through encrypted HTTPS communication and causes the external browser 311 to display a second screen that is based on the web document 121.

Each of the first screen and the second screen is the user authentication screen or the operation screen in the embedded device 10 described below. The first screen and the second screen are generated from the same web document 121 and are thus the same, excluding the differences caused by display settings defined separately for the embedded device 10 and the external terminal 30. The display settings are defined by cookies and include, for example, the frame rate of an animation contained in the screen or the frequency of throttling events when the screen is zoomed in, zoomed out, or scrolled.

(2) User Authentication

User authentication is described next. User authentication is performed, when the user starts using the embedded device 10, to identify the user as an authorized user or an unauthorized user.

To allow operation on the embedded device 10 from the external terminal 30 through the external network, security measures involve strong user authentication. The embedded device 10 may also be installed at a place with security measures. In this case, the user may directly touch the embedded device 10 for operation without user authentication.

As described above, different user authentication processes are used for when the user directly touches the embedded device 10 for operation and for when the user operates the embedded device 10 through the external network. The display system 1 thus generates user authentication screens for the two cases described above with the same web document 121 and switches between the user authentication processes based on the web browser being the connection source.

When receiving a user authentication request from the external browser 311 through HTTPS communication, the web server 112 causes the external browser 311 to display the user authentication input screen as the second screen. More specifically, when the user of the external terminal 30 operates the operation device 33 to use the embedded device 10, the external browser 311 transmits an HTML document for requesting user authentication to the embedded device 10 through HTTPS communication. The user authentication request is a request to access the uniform resource locator (URL) of the user authentication input screen in the web document 121.

When a user authentication request is transmitted by the external browser 311, the web server 112 receives the user authentication request with the external virtual server 142. The user authentication request that is encrypted through HTTPS communication is received and decrypted by the external virtual server 142. In response to the request, the external virtual server 142 returns the web document 121 for generating the user authentication input screen to the external browser 311 through HTTPS communication.

The web document 121 stored in the storage 12 includes a description for generating the user authentication screen. The user authentication screen includes a user authentication input screen and a user authentication end screen.

When the web document 121 is returned, the external browser 311 analyzes the returned web document 121, generates a screen, and displays the screen on the display 34. The external browser 311 displays, for example, the user authentication input screen illustrated in FIG. 4 on the display 34. The user of the external terminal 30 inputs, for user authentication, a username and a password on the user authentication input screen by operating the operation device 33.

The external browser 311 transmits the input username and password to the web server 112 through HTTPS communication. The external virtual server 142 determines, based on whether the username and the password transmitted from the external browser 311 are authorized, whether the user authentication is successful. The external virtual server 142 then returns the web document 121 for generating the user authentication end screen to the external browser 311 through HTTPS communication.

Figure 5:
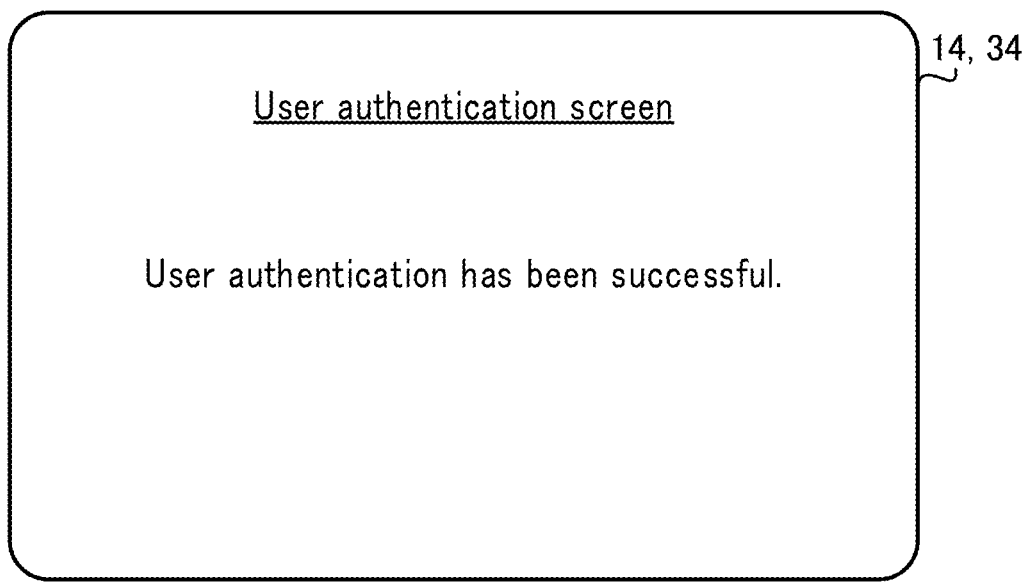
FIG. 5 is a diagram of an example user authentication end screen displayed in a built-in browser and the external browser in Embodiment 1.

When the user authentication is successful with the operation performed on the operation device 33, the external browser 311 displays, for example, the user authentication end screen illustrated in FIG. 5 indicating that the user authentication is successful on the display 34. When the user authentication is unsuccessful with the operation performed on the operation device 33, the external browser 311 displays another user authentication end screen (not illustrated) indicating that the user authentication is unsuccessful on the display 34.

When receiving a user authentication request from the built-in browser 111 through HTTP communication, the web server 112 causes the built-in browser 111 to display the user authentication end screen as the first screen without causing the built-in browser 111 to display the user authentication input screen. More specifically, when the user of the embedded device 10 operates the operation device 13 to use the embedded device 10, the built-in browser 111 transmits the HTML document for requesting user authentication to the embedded device 10 through HTTP communication. The user authentication request is a request to access the URL of the user authentication input screen in the web document 121.

When a user authentication request is transmitted by the built-in browser 111, the web server 112 receives the user authentication request with the internal virtual server 141. The received user authentication request that is unencrypted is not decrypted by the internal virtual server 141.

When the user authentication request is received from the built-in browser 111, operations performed by the user through the built-in browser 111 is expected to be highly secured. The internal virtual server 141 thus skips the process of displaying the user authentication input screen and causes the built-in browser 111 to display the user authentication end screen.

More specifically, when receiving the user authentication request from the built-in browser 111, the internal virtual server 141 changes the connection destination of the request from the user authentication input screen to the user authentication end screen by redirection or rewriting of the URL. Redirection herein refers to transferring an access to a specific URL to a different URL.

In redirection, the internal virtual server 141 transfers the connection destination included in the received request from the URL of the user authentication input screen to the URL of the user authentication end screen. In rewriting the URL, the internal virtual server 141 changes the URL of the connection destination included in the received request from the URL of the user authentication input screen to the URL of the user authentication end screen.

With such redirection or rewriting of the URL, the internal virtual server 141 directs the received request to the user authentication end screen without causing the user authentication input screen to be displayed. In response to the request, the internal virtual server 141 thus returns the web document 121 for generating the user authentication end screen in place of the user authentication input screen to the built-in browser 111 through HTTP communication.

When the web document 121 is returned, the built-in browser 111 analyzes the returned web document 121, generates a screen, and displays the screen on the display 14. More specifically, the built-in browser 111 displays the user authentication end screen indicating that the user authentication is successful on the display 14 as illustrated in, for example, FIG. 5.

As described above, when receiving a user authentication request from the built-in browser 111, the web server 112 does not cause the user authentication input screen to be displayed. This reduces the load on the embedded device 10 performing the user authentication process.

(3) Authentication of Web API

Authentication of the web API is described next. The application server 113 performs processing that is based on application software installed in the embedded device 10. The embedded device 10 incorporates application software prepared by the development vendor and application software developed by a third party other than the development vendor for operating the device. The application software calls the web API to operate the embedded device 10.

The web API returns, after an operation request to operate the embedded device 10 is transmitted as an HTML document and the embedded device 10 performs an operation based on the operation request, a response document of the operation result. To prevent unauthorized operation on the embedded device 10, an authentication process to receive or not to receive operation requests from the external network may be prepared based on web standards.

As illustrated in FIG. 2, the application server 113 includes an authentication controller 131 and a web API server 132. The authentication controller 131 performs an authentication process to allow use of the application software. The web API server 132 performs an application process that is based on the application software.

When the embedded device 10 is operated with the web API, the built-in browser 111 or the external browser 311 transmits an HTML document for requesting operation on the embedded device 10 to a specified URL in the embedded device 10. The built-in browser 111 and the external browser 311 are not permitted to directly access the application server 113 but are permitted to access the application server 113 through a reverse proxy.

Upon receiving an HTML document for the operation request with a URL of the web API as the connection destination from the built-in browser 111 through HTTP communication, the web server 112 operates as an internal reverse proxy and transfers the received HTML document to the application server 113. Upon receiving an HTML document for the operation request with a URL of the web API as the connection destination from the external browser 311 through HTTPS communication, the web server 112 operates as an external reverse proxy and transfers the received HTML document to the application server 113 after decrypting the document. With the web server 112 performing decryption, the application server 113 may not be compatible with encrypted HTTPS communication.

In the application server 113, the authentication controller 131 performs the authentication process for the operation request before the web API server 132 actually performs operation of the web API. The authentication process performed by the authentication controller 131 protects the web API and is different from the user authentication process performed for the user to access the embedded device 10.

More specifically, the authentication controller 131 determines whether the HTML document for the operation request includes correct authentication information. When the HTML document for the operation request does not include correct authentication information, the authentication controller 131 rejects the operation request and does not transfer the document to the web API server 132.

Figure 4:
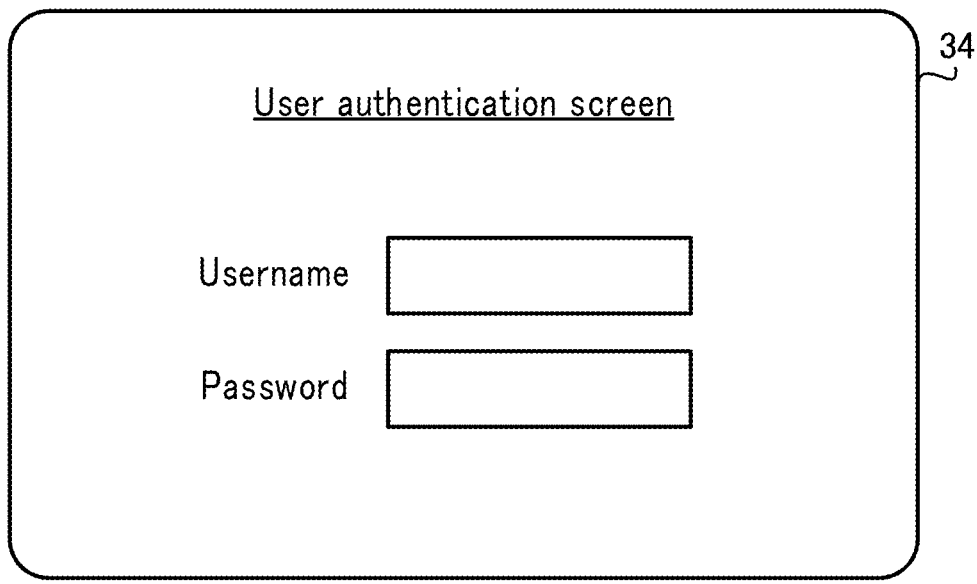
FIG. 4 is a diagram of an example user authentication input screen displayed in an external browser in Embodiment 1.

When the user authentication performed with the user authentication screen illustrated in FIG. 4 is successful, the web browser adds authentication information to the HTML document for the operation request. When the user performs an operation through the external browser 311, correct authentication information is added to the HTML document for the operation request. When the user performs an operation through the built-in browser 111, the user authentication performed with the user authentication screen is skipped. The correct authentication information is thus not added to the HTML document for the operation request.

When an HTML document for the operation request is transmitted from the built-in browser 111, the authentication controller 131 does not perform the authentication process and allows the HTML document for the operation request to pass through to the web API server 132 unconditionally. This prevents the operation request transmitted from the built-in browser 111 from being rejected by the authentication controller 131.

The authentication controller 131 determines whether the source of the operation request transferred from the web server 112 to the application server 113 is the built-in browser 111 or the external browser 311. The operation request is transferred from the web server 112 that functions as a reverse proxy. The direct source is thus the reverse proxy for the application server 113, irrespectively of whether the operation request is transmitted from the built-in browser 111 or the external browser 311. The source address for the application server 113 is thus the loopback address both when the operation request is transmitted from the built-in browser 111 and when transmitted from the external browser 311.

To allow the application server 113 to distinguish the source of the operation request between the built-in browser 111 and the external browser 311, the web server 112 further includes, as functional components, address assignors 143 and 144 as illustrated in FIG. 3.

When receiving an operation request transmitted from the built-in browser 111 through the internal virtual server 141, the web server 112 includes the address assignor 143 to assigns a loopback address to the received operation request as a source address. When receiving an operation request transmitted from the external browser 311 with the external virtual server 142, the web server 112 includes the address assignor 144 to assign an address of the external browser 311 to the received operation request as a source address.

More specifically, when receiving an operation request from the built-in browser 111 or the external browser 311, the web server 112 assigns the source address to the operation request by adding the source address to the header or the query parameter of the operation request.

As a first method of assigning an address, the web server 112 that functions as a reverse proxy adds the source address to the header of the operation request. The header of the operation request specifically corresponds to the HTML header being the header of the HTML document for the operation request. An HTML document includes a header and a body that are based on the HTML specifications. When using an HTML document with the web API, an operation request is described in the body of the HTML document.

The HTML header may have a standard header name defined by official standards or a non-standard header name. No standard header name is available for assigning the source address. However, as an accepted standard, the source address is frequently added to the HTML header name X-Forwarded-For or X-Real-IP. The web server 112 thus adds the source address to the X-Forwarded-For or X-Real-IP.

The authentication controller 131 then determines whether the HTML header of the HTML document includes X-Forwarded-For or X-Real-IP. When X-Forwarded-For or X-Real-IP indicates a loopback address, the authentication controller 131 skips the authentication process and allows the HTML document to pass through to the web API server 132.

As a second method of assigning an address, the web server 112 that functions as a reverse proxy may add the source address to the query parameter of the operation request. A query parameter is information added to the end of a URL. When a query parameter is used, the web server 112 adds the source address to the query parameter of the URL of the Web API that is a connection destination of the operation request.

In this case, the authentication controller 131 acquires the URL of the HTML document. When the source address of the query parameter of the URL is a loopback address, the authentication controller 131 skips the authentication process and allows the HTML document to pass through to the web API server 132.

The first and the second methods of assigning an address include rewriting by the reverse proxy. In particular, the first method of assigning an address includes updating the HTML document. In encrypted HTTPS communication, the communication data cannot be viewed or tampered along a communication path. Before rewriting is performed by the reverse proxy, the HTTPS server thus decrypts the operation request transmitted from the external browser 311. As described above, the web server 112 that distributes the web document 121 functions as the HTTPS server. In Embodiment 1, the web server 112 thus functions as a reverse proxy without having the reverse proxy as a separate unit.

The operation request assigned with the source address in this manner is transferred by the web server 112 to the application server 113. The authentication controller 131 in the application server 113 determines, based on the source address assigned to the operation request, whether the source of the operation request is the built-in browser 111 or the external browser 311.

When the source is determined to be the external browser 311, the authentication controller 131 performs the authentication process based on user authentication information included in the operation request. When the authentication is successful, the authentication controller 131 transfers the operation request to the web API server 132. When the source is determined to be the built-in browser 111, the authentication controller 131 transfers the operation request directly to the web API server 132 without performing the authentication process.

The authentication controller 131 thus uses the authentication result acquired with the user authentication screen when the operation request is transmitted from the external browser 311, and skips the authentication process when the operation request is transmitted from the built-in browser 111. The user authentication for the embedded device 10 and the authentication for the web API are not performed redundantly, reducing the load on the user.

In particular, when the web API is protected with authentication, the specifications for the authentication of the web API are disclosed to the developer of the application, and the application software is developed based on the specifications. When application software developed by a third party is installed in the embedded device 10, authorized application software alone may be installed. This reduces unauthorized use of the web API and unauthorized operation of the embedded device 10. With the web API usable through application software without authentication, the authentication specifications of the embedded device 10 is not disclosed to the third party, and the load on the user operating the embedded device 10 is reduced.

Upon receiving an operation request transferred from the authentication controller 131, the web API server 132 performs, as indicated by the transferred operation request, the application process that is based on the application software. For example, when the embedded device 10 is an air conditioning controller, the application process is processing for air conditioning control. In performing the application process, the web API server 132 instructs the web server 112 to cause the built-in browser 111 or external browser 311 to display an operation screen for performing the application process.

More specifically, when receiving an operation request from the built-in browser 111 through HTTP communication, the web server 112 causes the built-in browser 111 to display the operation screen as the first screen. In this case, the web server 112 functions as the internal virtual server 141 and transmits, in response to the operation request, the web document 121 for generating the operation screen in the embedded device 10 to the built-in browser 111 through HTTP communication. The web document 121 stored in the storage 12 includes a description for generating the operation screen.

Upon receiving the transmitted web document 121, the built-in browser 111 analyzes the web document 121, generates the operation screen, and displays the operation screen on the display 14. In one example, when the embedded device 10 is an air conditioning controller, the built-in browser 111 displays the operation screen illustrated in FIG. 6 on the display 14. While viewing such an operation screen, the user can turn on and off the air conditioner, switch the operation mode, and set the temperature and the fan power.

When receiving an operation request from the external browser 311 through HTTPS communication, the web server 112 causes the external browser 311 to display the operation screen as the second screen after an authentication process is performed by the authentication controller 131. In this case, the web server 112 functions as the external virtual server 142 and returns, in response to the operation request, the web document 121 for generating the operation screen in the embedded device 10 to the external browser 311 through HTTPS communication.

Figure 6:
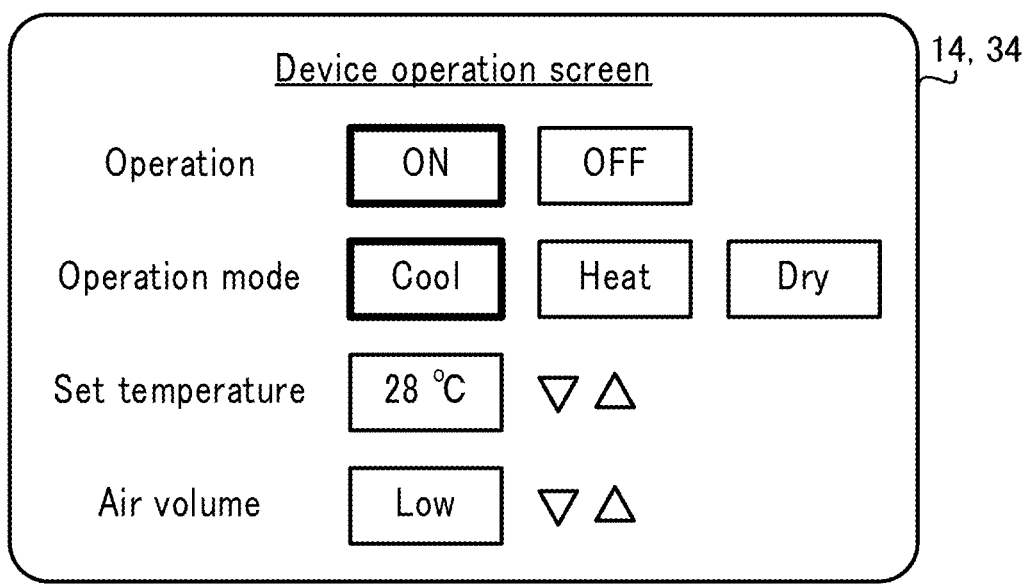
FIG. 6 is a diagram of an example operation screen displayed in the built-in browser and the external browser in Embodiment 1.

Upon receiving the transmitted web document 121, the external browser 311 analyzes the web document 121, generates the operation screen, and displays the operation screen similar to the screen in FIG. 6 on the display 34. The operation screen displayed in the built-in browser 111 and the operation screen displayed in the external browser 311 are the same, except the difference resulting from display settings.

The built-in browser 111 and external browser 311 receive operation information input by the user on such operation screens and transmit the operation information to the web server 112 and web API server 132. The web API server 132 performs the application process based on the transmitted operation information.

Figure 7:
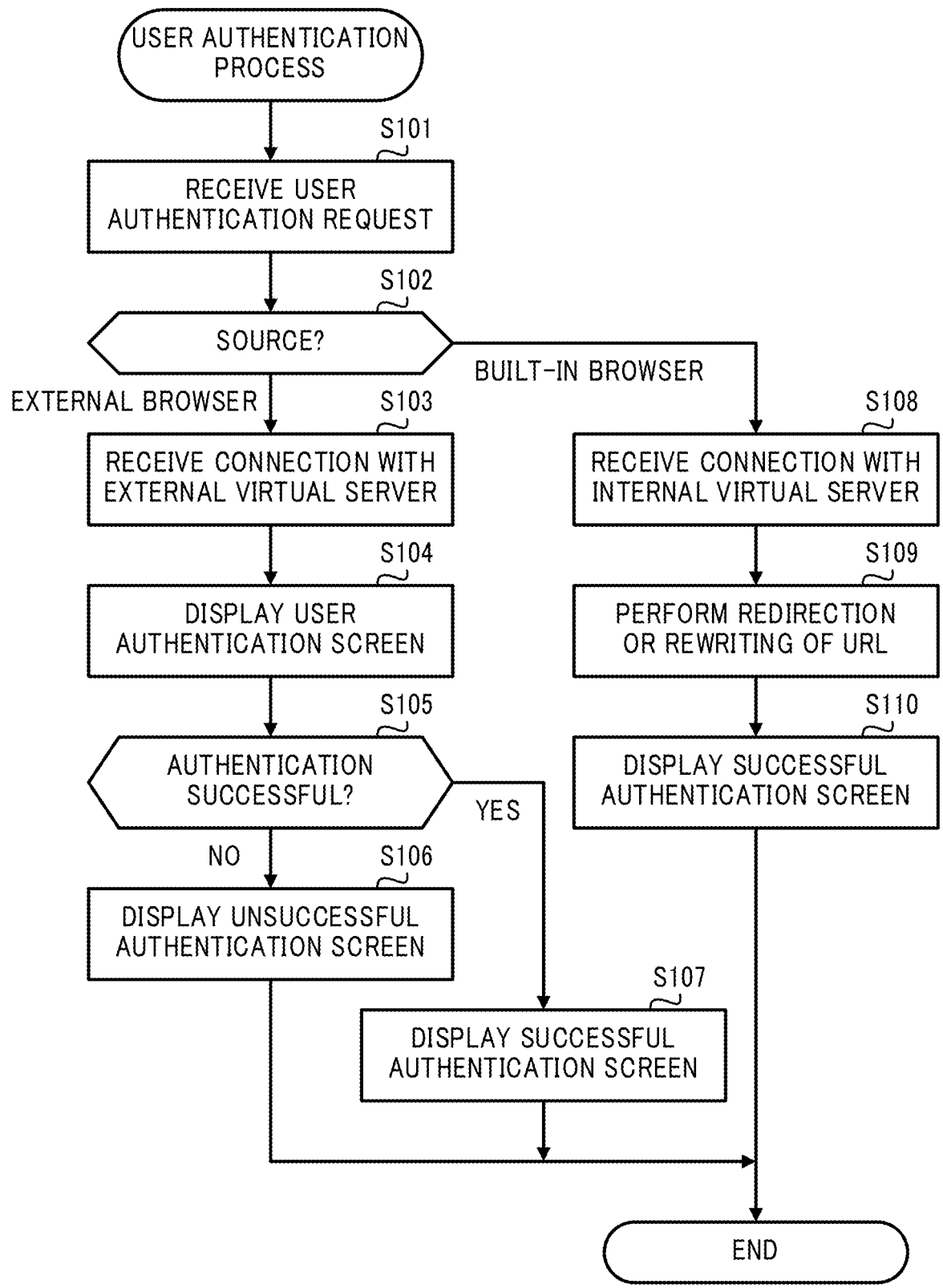
FIG. 7 is a flowchart of a user authentication process performed by an embedded device according to Embodiment 1.
Figure 8:
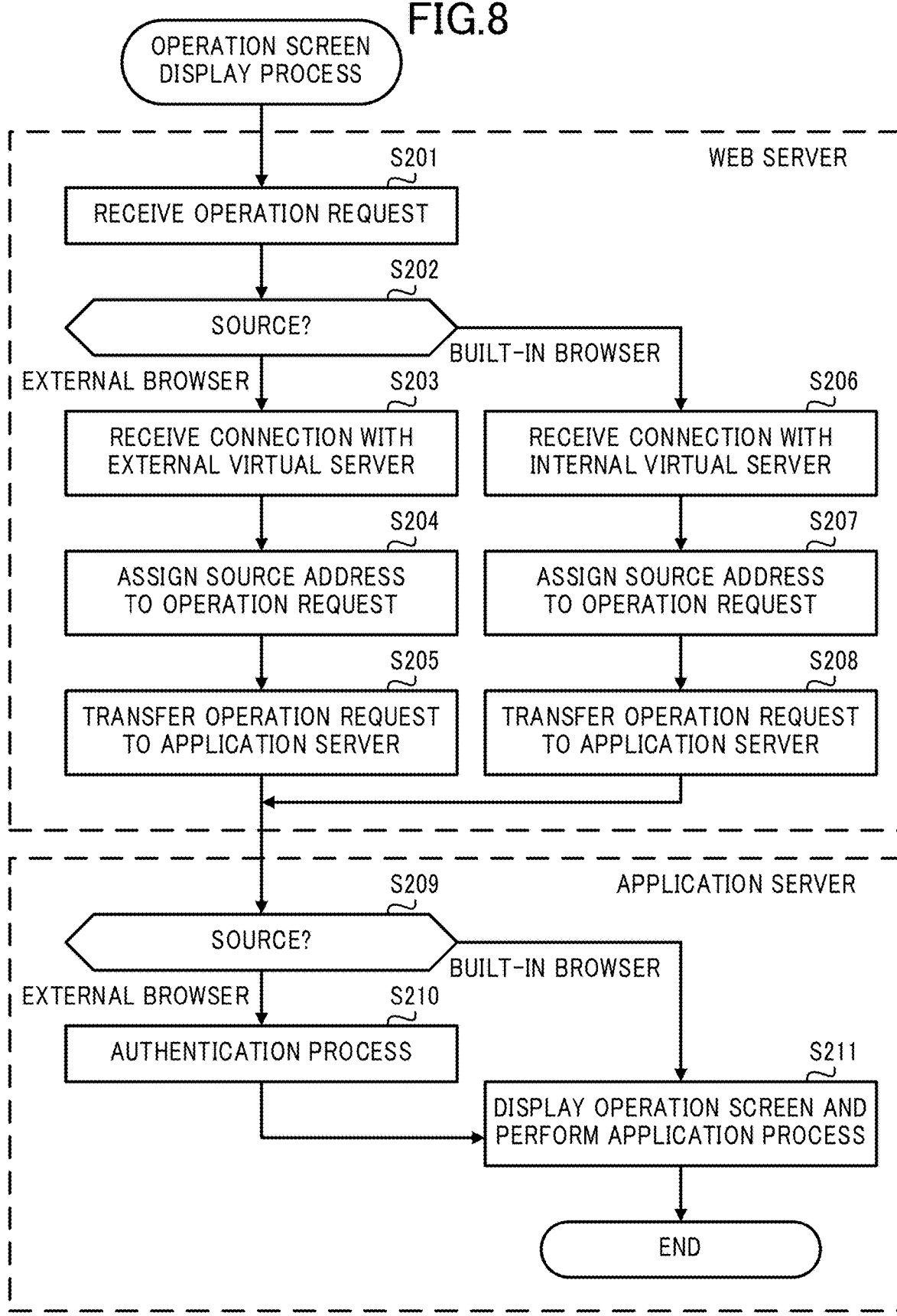
FIG. 8 is a flowchart of an operation screen display process performed by the embedded device according to Embodiment 1.

With reference to FIGS. 7 and 8, the processing performed by the display system 1 is described.

With reference to FIG. 7, the user authentication process performed by the embedded device 10 is described first. The user authentication process illustrated in FIG. 7 is performed when the user intends to start using the embedded device 10 by operating the operation device 13 in the embedded device 10 or the operation device 33 in the external terminal 30.

When the user authentication process starts, the web server 112 in the embedded device 10 receives a user authentication request (step S101). More specifically, when the user operates the operation device 13 in the embedded device 10, the built-in browser 111 transmits an HTML document for requesting user authentication to the web server 112 through internal communication in the embedded device 10. When the user operates the operation device 33 in the external terminal 30, the external browser 311 transmits an HTML document for requesting user authentication to the web server 112 through the external network. The web server 112 thus receives the HTML document for requesting user authentication transmitted from the built-in browser 111 or external browser 311.

Upon receiving the user authentication request, the web server 112 determines the source of the received request (step S102). More specifically, the web server 112 determines whether the source address is a loopback address. When the source address is a loopback address, the web server 112 determines that the source is the built-in browser 111. When the source address is an address other than a loopback address, the web server 112 determines that the source is the external browser 311.

When the source of the request is the external browser 311 (External browser in step S102), the web server 112 receives the connection with the external virtual server 142 (step S103). The external virtual server 142 decrypts the received request.

Upon receiving the connection, the external virtual server 142 transmits the web document 121 describing the user authentication input screen to the external browser 311 to cause the display 34 to display the user authentication input screen illustrated in, for example, FIG. 4 (step S104).

After causing the user authentication input screen to be displayed, the external virtual server 142 receives the username and the password input into the user authentication input screen from the external browser 311 and determines whether the user authentication is successful (step S105).

When the user authentication is unsuccessful (No in step S105), the external virtual server 142 transmits a web document 121 describing an unsuccessful authentication screen to the external browser 311 to cause the display 34 to display the unsuccessful authentication screen (step S106).

When the user authentication is successful (Yes in step S105), the external virtual server 142 transmits a web document 121 describing a successful authentication screen to the external browser 311 to cause the display 34 to display the successful authentication screen illustrated in, for example, FIG. 5 (step S107).

In step S102, when the source of the user authentication request is the built-in browser 111 (Built-in browser in step S102), the web server 112 receives the connection with the internal virtual server 141 (step S108).

Upon receiving the connection, the internal virtual server 141 directs the received request to the URL of the successful authentication screen by redirection or rewriting of the URL (step S109). The internal virtual server 141 then transmits the web document 121 describing the successful authentication screen to the built-in browser 111 to cause the display 14 to display the successful authentication screen illustrated in, for example, FIG. 5. (step S110). The user authentication process illustrated in FIG. 7 then ends.

With reference to FIG. 8, the operation screen display process performed by the embedded device 10 is described next. The operation screen display process illustrated in FIG. 8 is performed after the user authentication in the user authentication process illustrated in FIG. 7 is successful.

When the operation screen display process starts, the web server 112 receives an operation request to operate the embedded device 10 (step S201). More specifically, when the user operates the operation device 13 in the embedded device 10, the built-in browser 111 transmits an HTML document for the operation request to the web server 112 through internal communication in the embedded device 10. When the user operates the operation device 33 in the external terminal 30, the external browser 311 transmits an HTML document for the operation request to the web server 112 through the external network. The web server 112 thus receives the HTML document for the operation request transmitted from the built-in browser 111 or the external browser 311.

Upon receiving the operation request, the web server 112 determines the source of the received operation request (step S202). More specifically, the web server 112 determines whether the source address is a loopback address. When the source address is a loopback address, the web server 112 determines that the source is the built-in browser 111. When the source address is an address other than a loopback address, the web server 112 determines that the source is the external browser 311.

When the source of the operation request is the external browser 311 (External browser in step S202), the web server 112 receives the connection with the external virtual server 142 (step S203). The external virtual server 142 decrypts the received operation request.

Upon receiving the connection, the address assignor 144 assigns the source address to the operation request (step S204). More specifically, the address assignor 144 adds the address of the external browser 311 as the source address to the header or the query parameter of the received operation request.

After assigning the source address, the address assignor 144 transfers the operation request to the application server 113 (step S205).

In step S202, when the source of the operation request is the built-in browser 111 (Built-in browser in step S202), the web server 112 receives the connection with the internal virtual server 141 (step S206).

Upon receiving the connection, the address assignor 143 assigns the source address to the operation request (step S207). More specifically, the address assignor 143 adds a loopback address as the source address to the header or the query parameter of the received operation request.

After assigning the source address, the address assignor 143 transfers the operation request to the application server 113 (step S208).

Upon receiving the operation request transferred from the web server 112, the authentication controller 131 in the application server 113 determines the source of the transferred operation request (step S209). More specifically, the authentication controller 131 determines, based on the address assigned to the operation request, whether the source of the operation request is the external browser 311 or the built-in browser 111.

When the source is the external browser 311 (External browser in step S209), the authentication controller 131 performs the authentication process (step S210). More specifically, the authentication controller 131 determines whether the transferred operation request includes correct authentication information assigned by the external browser 311 in user authentication. When the operation request includes correct authentication information, the authentication controller 131 determines that the authentication is successful and allows the operation request to pass through to the web API server 132. When the operation request does not include correct authentication information, the authentication controller 131 determines that the authentication is unsuccessful and does not allow the operation request to pass through to the web API server 132.

When the source is the built-in browser 111 (Built-in browser in step S209), the authentication controller 131 skips the authentication process in step S210 and allows the transferred operation request to pass through to the Web API server 132 unconditionally.

Upon receiving the operation request transferred from the authentication controller 131, the web API server 132 causes the built-in browser 111 or external browser 311 to display the operation screen through the web server 112. The web API server 132 then performs the application process that is based on the transferred operation request (step S211).

More specifically, the web API server 132 instructs the web server 112 to display the operation screen. The web server 112 transmits the web document 121 describing the operation screen to the web browser in the built-in browser 111 or the external browser 311 being the source of the operation request, and causes the display 14 or 34 to display the operation screen illustrated in, for example, FIG. 6. The web API server 132 performs the application process based on the operation information input by the user on the operation screen. The operation screen display process illustrated in FIG. 8 then ends.

As described above, in the embedded device 10 according to Embodiment 1, the web server 112 transmits a web document 121 stored in the storage 12 to the built-in browser 111 through unencrypted communication and causes the built-in browser 111 to display the first screen that is based on the web document 121. The web server 112 transmits the web document 121 stored in the storage 12 to the external browser 311 through encrypted communication and causes the external browser 311 to display the second screen that is based on the web document 121.

The embedded device 10 that causes the built-in browser 111 and the external browser 311 to display a screen that is based on the same web document 121 uses different security measures for the built-in browser 111 and the external browser 311, thus reducing the processing load in communicating with the built-in browser 111. This improves the performance of the embedded device 10.

When the embedded device 10 according to Embodiment 1 receives a user authentication request from the external browser 311, the embedded device 10 causes the external browser 311 to display the user authentication input screen. When the embedded device 10 receives a user authentication request from the built-in browser 111, the embedded device 10 causes the built-in browser 111 to display the user authentication end screen without causing the built-in browser 111 to display the user authentication input screen. The embedded device 10 can switch the manner of user authentication based on the difference in security measures between when a connection is received from the built-in browser 111 and when a connection is received from the external browser 311. This improves the usability for the user.

In the embedded device 10 according to Embodiment 1, the web server 112 that distributes the web document 121 also functions as a reverse proxy for the web API and operates the virtual server. This allows the single web server 112 to have four different functions as an external web server, an external reverse proxy, an internal web server, and an internal reverse proxy. This can save the resources of the embedded device 10.

In the embedded device 10 according to Embodiment 1, when the web server 112 receives a user authentication request from the built-in browser 111, the web server 112 changes the connection destination of the user authentication request from the user authentication input screen to the user authentication end screen by redirection or rewriting of the URL. The process of switching the screen between when the connection is received from the built-in browser 111 and when the connection is received from the external browser 311 can also be performed by describing the process in JavaScript of the web document 121. The JavaScript source code of the web document 121 can be referenced through the web browser. Thus, internal processing described in the JavaScript can leak. Embodiment 1 uses redirection or rewriting of the URL. This allows processes that can be leaked alone to be described in JavaScript source code in a web document 121, preventing leakage of information about internal processing.

Embodiment 2

Embodiment 2 is now described. The same components and functions as in Embodiment 1 are not described.

In Embodiment 1 described above, the web server 112 skips user authentication when the web server 112 is connected from the built-in browser 111 by performing redirection or rewriting of the URL. In Embodiment 2, when the web server 112 is connected from the built-in browser 111, the web server 112 directs the connection to a screen for user authentication with an authentication device 400 incorporated in the embedded device 10.

The user operating the external browser 311 is usually distanced from the embedded device 10 physically, and thus has difficulty in operating a hardware device incorporated in the embedded device 10. However, with the application server 113 that can operate a hardware device being operable in the embedded device 10, the user operating the built-in browser 111 can operate the hardware device. In Embodiment 2, the authentication device 400 as a hardware device is incorporated in the embedded device 10 and is used to authenticate the user operating the embedded device 10.

Figure 9:
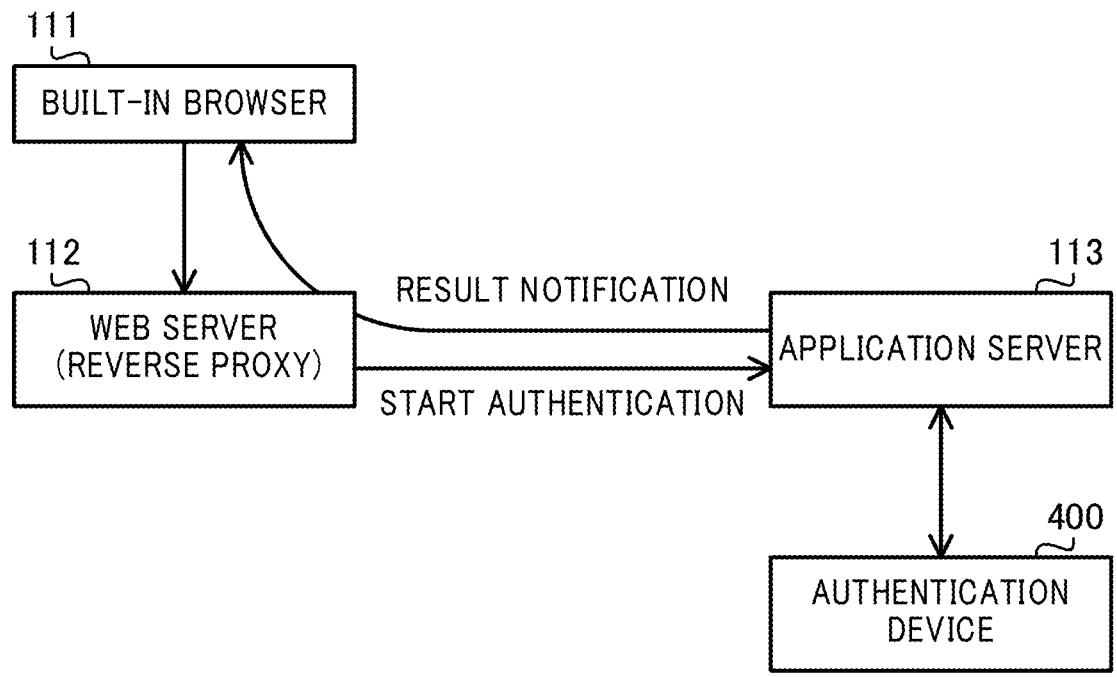
FIG. 9 is a block diagram of an embedded device according to Embodiment 2, illustrating user authentication with an authentication device.

With reference to FIG. 9, the structure for user authentication in Embodiment 2 is described. The embedded device 10 according to Embodiment 2 further includes the authentication device 400. The authentication device 400 authenticates the user operating the embedded device 10.

The authentication device 400 is, for an example, a biometric authentication device that authenticates a user with biometrics such as, fingerprint authentication, face authentication, vein authentication, or iris authentication. In another example, the authentication device 400 may be a reader, such as a contact integrated circuit (IC) card reader or a near-field communication (NFC) reader that reads an identification (ID) card of the user.

The user can operate the authentication device 400 at hand while viewing the built-in browser 111. For user authentication with the authentication device 400, the user accesses the authentication device 400 physically.

When receiving a user authentication request from the built-in browser 111 through unencrypted HTTP communication, the web server 112 causes, with the function of the internal virtual server 141, the built-in browser 111 to display a screen prompting an operation on the authentication device 400 as the first screen.

More specifically, the web server 112 changes, by redirection or rewriting of the URL, the connection destination of the user authentication request from the user authentication input screen illustrated in FIG. 4 to the screen prompting an operation on the authentication device 400. The web server 112 then transmits the web document 121 for generating the screen prompting an operation on the authentication device 400 to the built-in browser 111 through HTTP communication. In Embodiment 2, the web document 121 includes a description for generating the screen prompting an operation on the authentication device 400.

Figure 10:
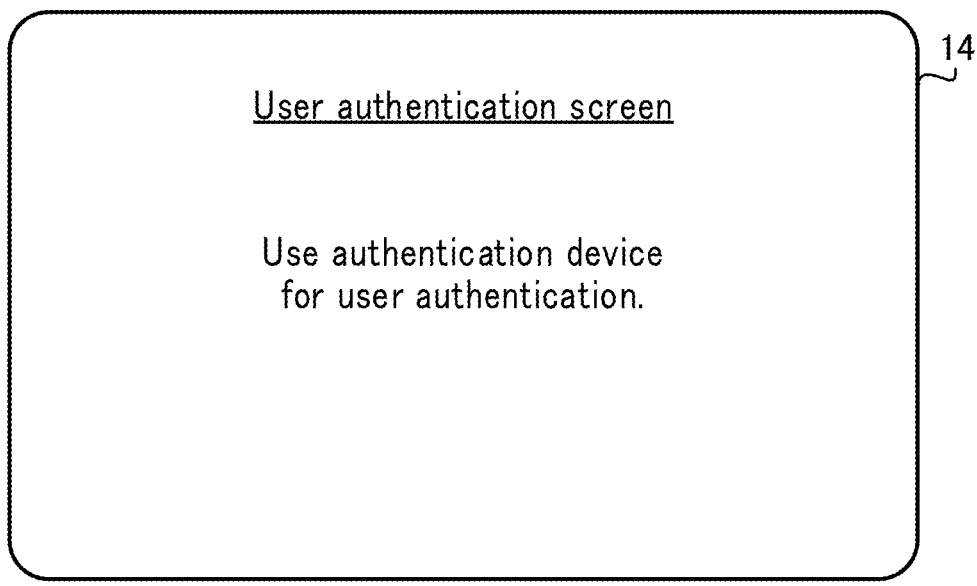
FIG. 10 is a diagram of an example screen prompting an operation on the authentication device displayed in a built-in browser in Embodiment 2.

The built-in browser 111 displays, on the display 14, a screen instructing the user to be authenticated using the authentication device 400 as illustrated in, for example, FIG. 10. The built-in browser 111 displays such a screen as the first screen that is based on the web document 121 transmitted from the web server 112. Upon viewing such a screen, the user physically accesses the authentication device 400 to be authenticated with biometrics or reading of a card.

The web server 112 assigns, with the address assignor 143, a loopback address being the source address to the user authentication request transmitted from the built-in browser 111, and transfers the user authentication request to the application server 113. This causes the web server 112 to call the web API to control the authentication device 400 and to start the operation on the authentication device 400. The user authentication request is transferred to the web API server 132 without the authentication controller 131 performing the authentication process, as with the operation request transmitted from the built-in browser 111 described in Embodiment 1.

The web API server 132 then monitors the authentication device 400 and determines whether the user authentication performed by the authentication device 400 is successful. The web API server 132 then notifies the built-in browser 111 of the user authentication result through the web server 112. For example, when the user authentication is successful, the web API server 132 causes, through the web server 112, the built-in browser 111 to display a screen indicating successful user authentication as illustrated in FIG. 5. When the user authentication is unsuccessful, the web API server 132 causes, through the web server 112, the built-in browser 111 to display a screen indicating unsuccessful user authentication.

The web API server 132 provides the notification to the built-in browser 111 based on the specifications of the web. One method may include periodically querying the result of user authentication by polling in JavaScript operating in the built-in browser 111. Another method may include connecting the built-in browser 111 to the web API server 132 with WebSocket when the authentication device 400 starts operating. The web API server 132 then notifies the built-in browser 111 of successful user authentication with WebSocket.

When receiving a user authentication request from the external browser 311 through encrypted HTTPS communication, the web server 112 performs the same process as in Embodiment 1 with the functions of the external virtual server 142. More specifically, the web server 112 transmits the web document 121 stored in the storage 12 to the external browser 311 through HTTPS communication. The web server 112 then causes the external browser 311 to display, as the second screen, the user authentication input screen illustrated in, for example, FIG. 4 without using the authentication device 400.

The authentication device 400 may be pre-incorporated in the embedded device 10 at the factory. The authentication device 400 may be added to the embedded device 10 by being connected to, for example, a slot or a USB connector in the embedded device 10. As described above, application software can be added to the application server 113. User authentication with the authentication device 400 can thus be added by incorporating a web API that operates the authentication device 400 as application software.

The authentication device 400 is not limited to a biometric device or a reader. For example, the authentication device 400 may perform user authentication using a personal identification number (PIN) code. When using a PIN code, a username and a password are described in the local storage area of the embedded device 10. The PIN code being a four-digit number is then used as an access key to the local storage area. Using a PIN code also includes hardware access to the local storage area. A similar method as when the authentication device 400 is a biometric device or a reader can be used.

Embodiment 3

Embodiment 3 is now described. The same components and functions as in Embodiments 1 and 2 are not described.

In Embodiment 1 described above, the web server 112 includes the internal virtual server 141 and the external virtual server 142 as functional components. In Embodiment 3, the web server 112 has no virtual server functions.

To differentiate security measures between a connection from the built-in browser 111 and a connection from the external browser 311 without using virtual servers, a single server may have operations of both an HTTP server and an HTTPS server. More specifically, the single web server 112 can operate as both an HTTP server and an HTTPS server.

In this case, when the web server 112 receives a connection from the built-in browser 111 through internal communication, the web server 112 receives the connection with the HTTP server. When the web server 112 receives a connection from the external browser 311 in the external terminal 30 through the external network, the web server 112 receives the connection with the HTTPS server. The web server 112 is to be controlled with a firewall to allow connection to the HTTP server from the built-in browser 111 but not to allow connection to the HTTP server from the external network. This can differentiate security measures between a connection from the built-in browser 111 and a connection from the external browser 311.

However, when a single server has operations of both the HTTP server and the HTTPS server, the HTTP server and the HTTPS server are not separate. Thus, redirection and rewriting of the URL cannot be performed based on whether the connection source is the built-in browser 111 or the external browser 311.

To perform redirection and rewriting of the URL without virtual servers, two identical web servers 112 may be prepared using different port numbers of the HTTP server and the HTTPS server. More specifically, one of the two web servers 112 is activated with an HTTP setting and the other is activated with an HTTPS setting.

With the different settings between HTTP and HTTPS, redirection and rewriting of the URL can be performed based on whether the connection source is the built-in browser 111 or the external browser 311. However, when two web servers 112 are activated in this manner, the embedded device 10 uses more resources.

In Embodiment 3, the web server 112 is thus virtualized. Virtualization of the web server 112 refers to activating a single web server application and operating multiple different web servers in the single web server application. In other words, virtualization of the web server 112 uses the functions of web server software that can be implemented by the web server software alone. The web server software is, for example, Nginx (registered trademark).

In Embodiment 3, the web server 112 is virtualized with virtual machines. The virtual machines use virtual machine software in addition to the web server software. The virtual machine software is, for example, Linux (registered trademark) Kernel-based Virtual Machine (KVM), VirtualBox, or VMware (registered trademark).

When using virtual machines, multiple virtual machines operate in the embedded device 10. Multiple virtual web servers operate in the multiple virtual machines as the web server 112. The web server 112 includes a first virtual machine to perform unencrypted communication with the built-in browser 111 and includes a second virtual machine to perform encrypted communication with the external browser 311.

Figure 11:
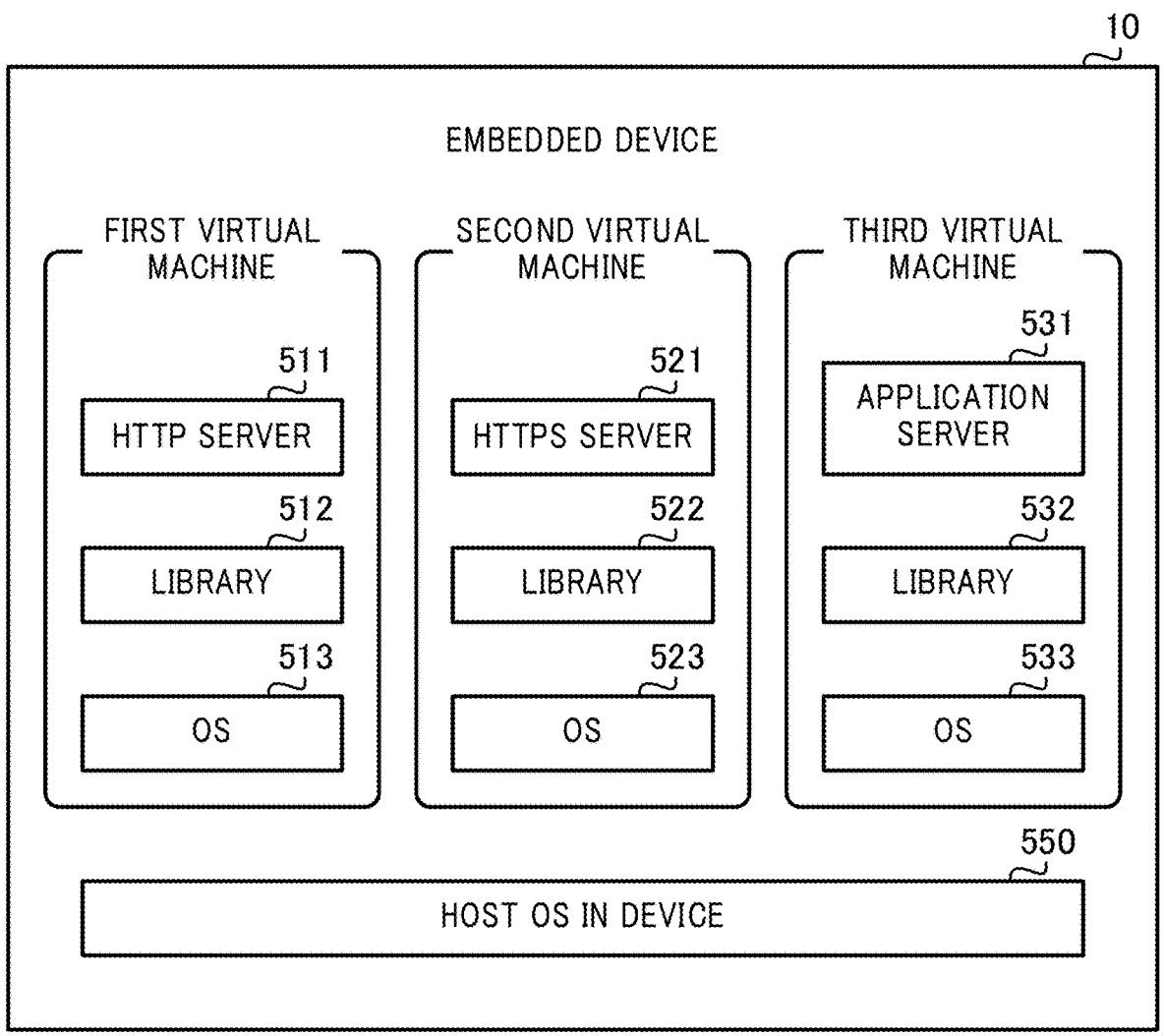
FIG. 11 is a block diagram of an embedded device according to Embodiment 3, illustrating the system structure with virtual machines.

More specifically, as illustrated in FIG. 11, the embedded device 10 according to Embodiment 3 includes multiple virtual machines, or first to third virtual machines as functional components. The first to third virtual machines operate on a host operating system (OS) 550 in the embedded device 10. The first to third virtual machines operate based respectively on libraries 512, 522, and 532. In the first virtual machine, an OS 513 and an HTTP server 511 operate. In the second virtual machine, an OS 523 and an HTTPS server 521 operate. In the third virtual machine, an OS 533 and an application server 531 operate. Thus, different OSes operate individually on the first to third virtual machines, and different servers operate individually on the different OSes.

When the web server 112 receives a connection from the built-in browser 111, the HTTP server 511 operating in the first virtual machine receives the connection. When the web server 112 receives a connection from the external browser 311, the HTTPS server 521 operating in the second virtual machine receives the connection. The same processing as the internal virtual server 141 described in Embodiment 1 is performed in the first virtual machine, the same processing as the external virtual server 142 described in Embodiment 1 is performed in the second virtual machine, and the same processing as the application server 113 described in Embodiment 1 is performed in the third virtual machine. With a network file shared by different virtual machines, the first virtual machine and the second virtual machine use a common web document 121.

Thus, in Embodiment 3, the web server 112 causes the first to third virtual machines to operate in the embedded device 10 without using virtual servers. The web server 112 causes the HTTP server 511 to operate in the first virtual machine and causes the HTTPS server 521 to operate in the second virtual machine. The external network can access the second virtual machine alone. This improves security.

The example system configuration illustrated in FIG. 11 uses a host virtual machine among multiple types of virtual machine. However, other types of virtual machine also cause multiple virtual machines to operate in the same embedded device 10, similarly to the host virtual machine. Thus, other types of virtual machine may also be used.

Embodiment 4

Embodiment 4 is now described. The same components and functions as in Embodiments 1 to 3 are not described.

In Embodiment 3 described above, multiple virtual machines operate in the embedded device 10. However, the embedded device 10 including hardware resources such as a CPU and a memory that are smaller than the resources in a typical personal computer may have difficulty in operating multiple virtual machines. In Embodiment 4, the web server 112 is virtualized with container virtualization.

Container virtualization includes simplified virtualization software that can be implemented with fewer hardware resources than virtual machines. Container virtualization uses container virtualization software in addition to the web server software. Container virtualization software indicates, for example, Docker (registered trademark).

Container virtualization uses containers each being a single package of configuration files used for the web server 112 and the operation of the web server 112. Each container can operate separately. In other words, multiple containers are generated in the embedded device 10. Multiple virtual web servers operate in the multiple containers as web servers 112. Although container virtualization resembles the method of activating multiple identical web servers 112, container virtualization uses a separate file system for each operating container.

In the structure using virtual machines described in Embodiment 3, the machines are virtualized with an independent OS operating in each virtual machine. In contrast, container virtualization uses a single operating OS in the embedded device 10, thus theoretically using fewer hardware resources than the structure using virtual machines.

The web server 112 includes a first container generated by container virtualization to perform unencrypted communication with the built-in browser 111 and includes a second container generated by container virtualization to perform encrypted communication with the external browser 311.

Figure 12:
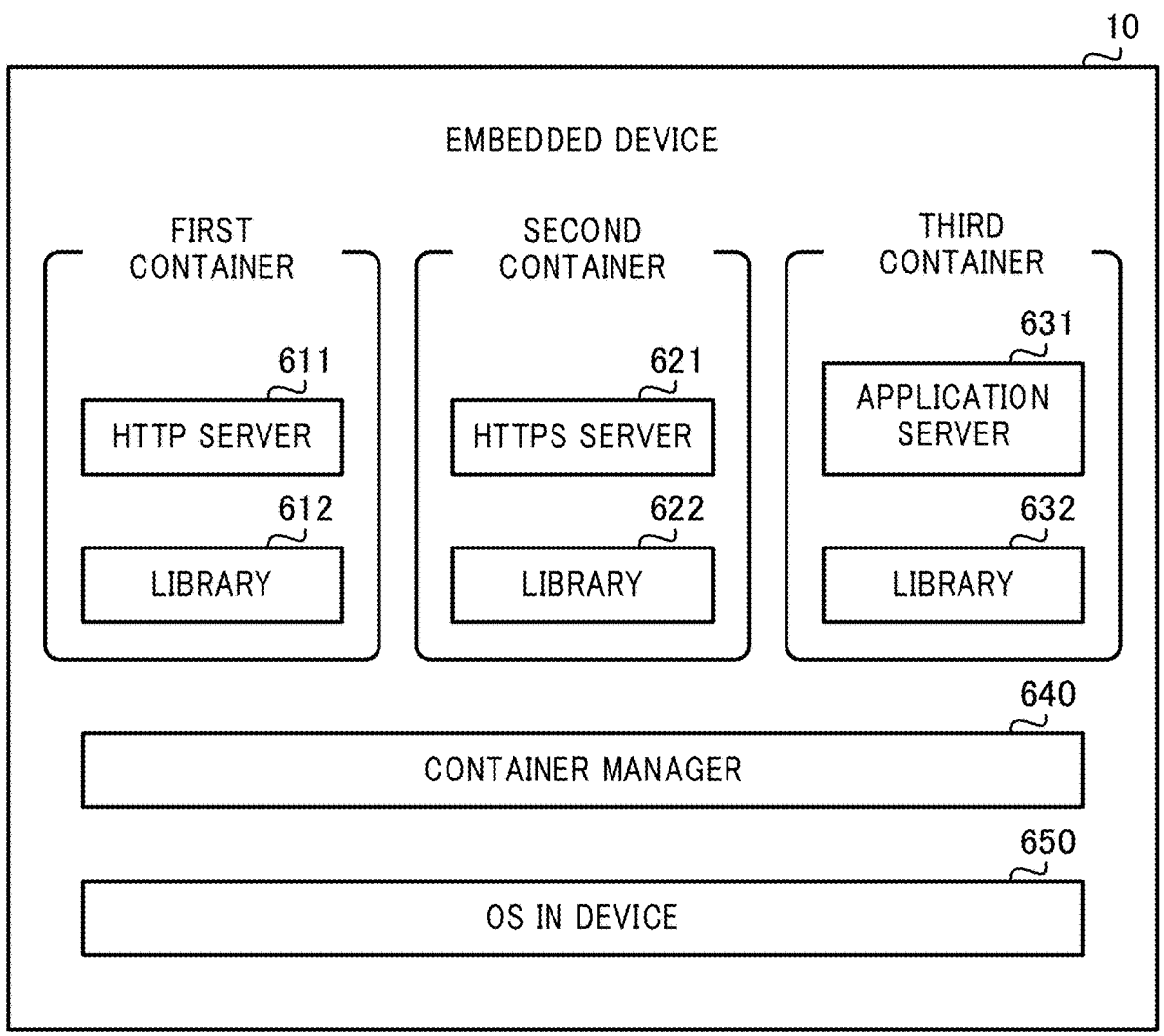
FIG. 12 is a block diagram of an embedded device according to Embodiment 4, illustrating the system structure with container virtualization.

More specifically, as illustrated in FIG. 12, the embedded device 10 according to Embodiment 4 includes multiple containers, or first to third containers and a container manager 640 as functional components. Each of the first to third containers is managed by the container manager 640 and operates on an OS 650 in the embedded device 10. The first to third containers operate based respectively on libraries 612, 622, and 632. In the first container, an HTTP server 611 operates. In the second container, an HTTPS server 621 operates. In the third container, an application server 631 operates. Thus, different servers operate individually on different containers.

When the web server 112 receives a connection from the built-in browser 111, the HTTP server 611 operating in the first container receives the connection. When the web server 112 receives a connection from the external browser 311, the HTTPS server 621 operating in the second container receives the connection. The same processing as the internal virtual server 141 described in Embodiment 1 is performed in the first container, the same processing as the external virtual server 142 described in Embodiment 1 is performed in the second container, and the same processing as the application server 113 described in Embodiment 1 is performed in the third container.

Redirection and rewriting of the URL performed by the web server 112 are set with the first container. The first to third containers each can access the file systems in the embedded device 10. The web document 121 for generating a common screen may thus be stored in the file systems in the embedded device 10.

In Embodiment 4, as described above, the web server 112 generates the first to third containers in the embedded device 10. The web server 112 causes the HTTP server 611 to operate in the first container and causes the HTTPS server 621 to operate in the second container. With the file systems separate for each container, a screen dedicated to the built-in browser 111 is included in the first container alone. The external network thus cannot access the screen dedicated to the built-in browser 111.

Modifications

Although one or more embodiments of the present disclosure have been described above, the present disclosure is not limited to the embodiments, and any combination, modification, or elimination may be made appropriately.

For example, in the above embodiments, the embedded device 10 uses different security measures for the display process in the built-in browser 111 and the display process in the external browser 311 in each of (1) encrypted communication, (2) user authentication, and (3) web API authentication. However, the embedded device 10 may use a different security measure in at least one of (1) to (3) above, in place of using different security measures in all of (1) to (3).

The user authentication screen in the built-in browser 111 may be changed based on the settings input by the user. For example, when receiving a user authentication request from the built-in browser 111, the web server 112 causes, by default, the built-in browser 111 to display the same user authentication input screen as when a user authentication request is received from the external browser 311. When receiving a user authentication request from the built-in browser 111, the web server 112 may switch between, based on the settings input by the user through the operation device 13, causing the built-in browser 111 to display the default input screen and causing the built-in browser 111 to display the user authentication end screen without causing the built-in browser 111 to display the input screen. The web server 112 may additionally have an option of displaying the screen prompting an operation on the authentication device 400 described in Embodiment 2. The web server 112 can switch screens when receiving a user authentication request from the built-in browser 111 by redirection or rewriting of the URL based on the settings input by the user.

In the embodiments described above, the embedded device 10 is an air conditioning controller. However, the embedded device 10 may be, but is not limited to, an electronic device such as a water heater, a rice cooker, a washing machine, a refrigerator, or a television or a controller for operating such a device.

In the embodiments described above, HTTP communication and HTTPS communication are used as examples of unencrypted communication and encrypted communication. However, communication based other than on HTTP and HTTPS may be used.

In the above embodiments, in the controller 11, the CPU executes the programs stored in the storage 12 to implement the functions of the built-in browser 111, the web server 112, and the application server 113. In the controller 31, the CPU executes the programs stored in the storage 32 to implement the function of the external browser 311. However, the controllers 11 and 31 may be dedicated hardware. Examples of the dedicated hardware include a single circuit, a complex circuit, a programmed processor, an application-specific integrated circuit (ASIC), a field-programmable gate array (FPGA), or a combination of two or more of these. When the controllers 11 and 31 are dedicated hardware, the function of each component may be implemented by individual hardware devices, or the functions of the components may be collectively implemented by a single hardware device.

Some functional components may be implemented by dedicated hardware, and others may be implemented by software or firmware. The controllers 11 and 31 can thus implement the above functions with hardware, software, firmware, or a combination of two or more of these.

When a program defining the operation of the embedded device 10 and the external terminal 30 is used in an existing computer such as a personal computer or an information terminal, the computer can function as the embedded device 10 and the external terminal 30.

The above program may be distributed in any method. For example, the program stored in a non-transitory computer-readable recording, such as a compact disk ROM (CD-ROM), a digital versatile disk (DVD), a magneto-optical disk (MO), or a memory card, may be distributed or the program may be distributed through a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. An embedded device connectable to an external terminal including an external browser to communicate with the external terminal, the embedded device comprising:
   a storage to store a web document;
   a built-in browser; and
   a web server to transmit the web document stored in the storage to the built-in browser through unencrypted communication and cause the built-in browser to display a first screen that is based on the web document, and to transmit the web document stored in the storage to the external browser through encrypted communication and cause the external browser to display a second screen that is based on the web document, wherein
   the web server includes an internal virtual server to perform the unencrypted communication with the built-in browser and includes an external virtual server to perform the encrypted communication with the external browser.

2. The embedded device according to claim 1, wherein the web server causes, when receiving a request for user authentication from the built-in browser through the unencrypted communication, the built-in browser to display an end screen for the user authentication as the first screen without causing the built-in browser to display an input screen for the user authentication, and the web server causes, when receiving the request for the user authentication from the external browser through the encrypted communication, the external browser to display the input screen as the second screen.

3. The embedded device according to claim 2, wherein the web server changes, when receiving the request for the user authentication from the built-in browser, a connection destination of the received request from the input screen to the end screen by redirection or rewriting of a uniform resource locator.

4. The embedded device according to claim 2, wherein when receiving the request for the user authentication from the built-in browser or the external browser, the web server determines, based on whether an address of a source of the received request is a loopback address, whether the source of the received request is the built-in browser or the external browser.

5. The embedded device according to claim 2, wherein when receiving the request for the user authentication from the built-in browser, the web server switches between, based on a setting input by a user, causing the built-in browser to display the input screen as the first screen and causing the built-in browser to display the end screen without causing the built-in browser to display the input screen as the first screen.

6. The embedded device according to claim 1, wherein the web server causes, when receiving an operation request from the built-in browser through the unencrypted communication, the built-in browser to display an operation screen for the embedded device as the first screen, and
the web server causes, when receiving the operation request from the external browser through the encrypted communication, the external browser to display the operation screen as the second screen.

7. The embedded device according to claim 1, further comprising:
an application server to perform an authentication process to allow use of application software and an application process that is based on the application software, wherein
when the web server receives an operation request from the built-in browser through the unencrypted communication, the application server performs the application process without performing the authentication process, and
when the web server receives the operation request from the external browser through the encrypted communication, the application server performs the application process after performing the authentication process.

8. The embedded device according to claim 7, wherein the web server assigns, when receiving the operation request from the built-in browser or the external browser, an address of a source of the received operation request to the operation request, and
the application server determines, based on the address of the source assigned to the operation request, whether the source is the built-in browser or the external browser.

9. The embedded device according to claim 8, wherein the web server assigns, when receiving the operation request from the built-in browser or the external browser, the address of the source to the operation request by adding the address of the source to a header or a query parameter of the received operation request.

10. The embedded device according to claim 1, further comprising:
an authentication device to authenticate a user operating the embedded device, wherein
the web server causes, when receiving a request for user authentication from the built-in browser through the unencrypted communication, the built-in browser to display, as the first screen, a screen prompting an operation on the authentication device, and
the web server causes, when receiving the request for the user authentication from the external browser through the encrypted communication, the external browser to display, as the second screen, an input screen for the user authentication without using the authentication device.

11. The embedded device according to claim 1, wherein the web server includes a first virtual machine operable in the embedded device to perform the unencrypted communication with the built-in browser and includes a second virtual machine operable in the embedded device to perform the encrypted communication with the external browser.

12. The embedded device according to claim 1, wherein the web server includes a first container generated by container virtualization to perform the unencrypted communication with the built-in browser and includes a second container generated by the container virtualization to perform the encrypted communication with the external browser.

13. A display system, comprising:
the embedded device according to claim 1; and
the external terminal.

* * * * *